Figure 3:
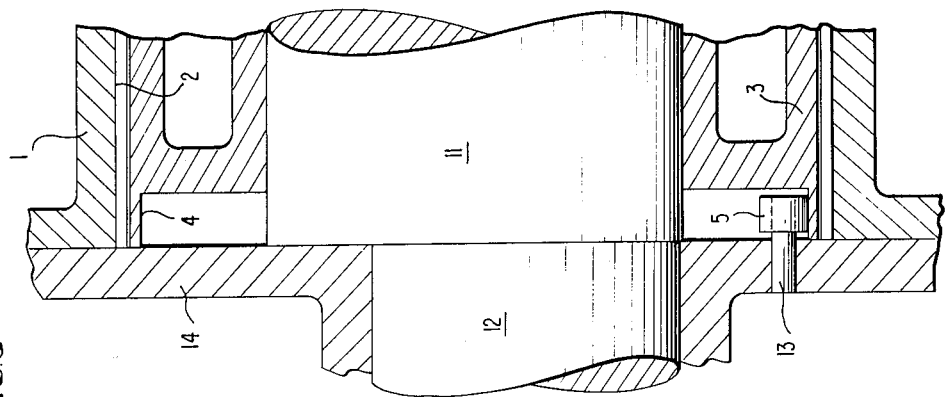

March 29, 1966 R. HUBER 3,242,912
ROTARY PISTON ENGINE
Filed Dec. 7, 1961 2 Sheets-Sheet 1
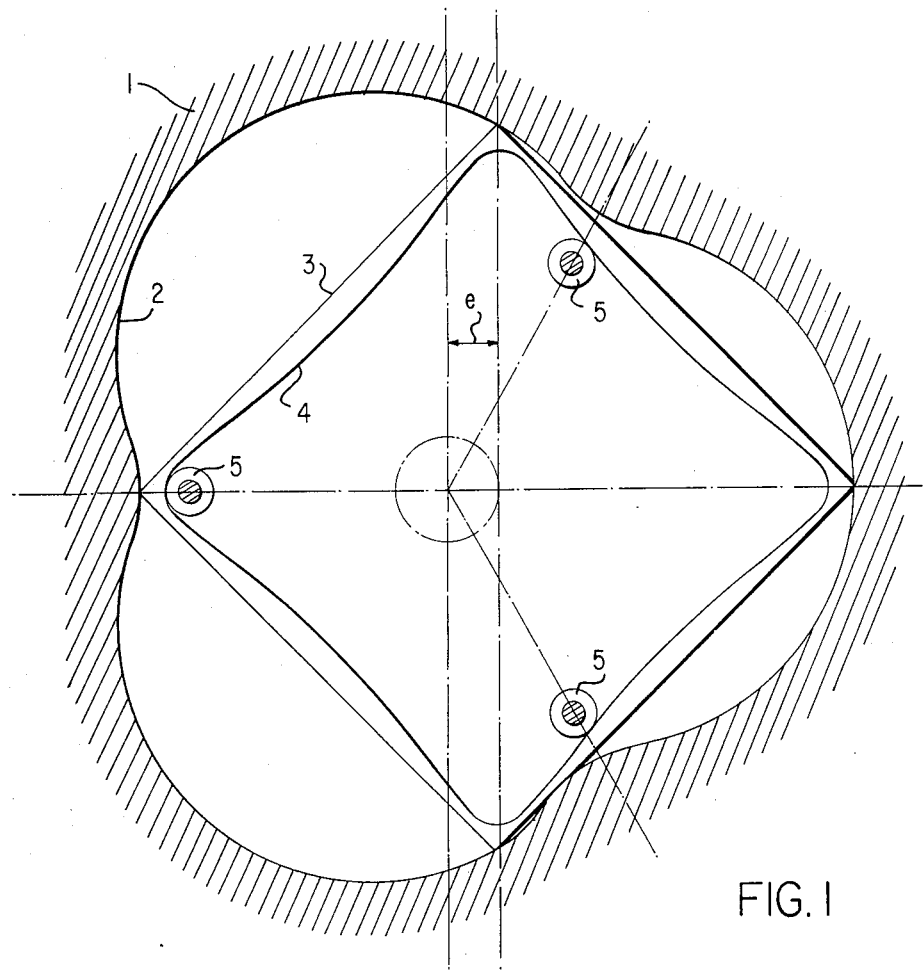
FIG. I
INVENTOR.
REINHOLD HUBER
BY *Dicke and Craig*
ATTORNEYS.

March 29, 1966  R. HUBER  3,242,912
ROTARY PISTON ENGINE
Filed Dec. 7, 1961  2 Sheets-Sheet 2

INVENTOR
REINHOLD HUBER
BY Dicke & Craig
ATTORNEYS

United States Patent Office 3,242,912
Patented Mar. 29, 1966

3,242,912
ROTARY PISTON ENGINE
Reinhold Huber, Esslingen (Neckar), Zollberg, Germany, assignor to Daimler-Benz Aktiengesellschaft, Stuttgart, Unterturkheim, Germany
Filed Dec. 7, 1961, Ser. No. 157,688
Claims priority, application Germany, Dec. 9, 1960, D 34,908
9 Claims. (Cl. 123—8)

The present invention relates to a rotary-piston internal combustion engine of trochoidal construction provided with a piston carrying out a rotary movement within a housing about an eccentric arranged on the drive shaft or output shaft of the engine.

It has already been proposed for internal combustion engines of this type to replace the known transmission mechanism between housing and piston which consists of an externally toothed concentrically seated pinion or ring gear rigid with the housing and of an internally toothed gear rigid at the piston, by trochoidally-shaped cam tracks arranged at the housing for the guidance of the piston in order that the drive shaft or engine shaft may be provided with a diameter also sufficient for diesel operation.

It has now been discovered that the same problem may also be solved by arranging according to the present invention, for purposes of achieving the rotary movement, at least one trochoidally-shaped cam track at the piston by means of which the piston is guided with respect to the housing.

By the use of cam tracks rigidly connected with the piston, not only larger shaft diameters may be realized than with cam tracks at the housing but there is also achieved in a particularly advantageous manner that cam tracks at the pistons in internal combustion engines of multi-disk construction no longer have to be separated or subdivided as would have to be the case with cam tracks secured at the housing.

According to a further feature of the present invention, guide rollers may be provided rigidly arranged at the housing on which is supported the piston with the cam track thereof.

In internal combustion engines provided with an epitrochoidally-shaped or hypotrochoidally-shaped housing and with a piston constructed as the internal envelope thereof, the cam track at the piston may be constructed of hypotrochoidal shape or of epitrochoidal shape, respectively. In contrast thereto, the cam track at the piston in an internal combustion engine with an epitrochoidally-shaped or hypotrochoidally-shaped piston within a housing as the external envelope thereof may be constructed of epitroichoidal shape or hypotrochoidal shape, respectively.

Additionally, the trochoidally-shaped cam track may be constructed as internal contour.

Accordingly, it is an object of the present invention to provide a rotary piston internal combustion engine of trochoidal construction which achieves the aforementioned aims in a simple manner without involving large expenditures.

Still another object of the present invention resides in the provision of a guide arrangement for a rotary piston internal combustion engine of trochoidal construction which permits the attainment of relatively large shaft diameters for the engine shaft.

A further object of the present invention resides in the provision of a guide arrangement for a rotary piston internal combustion engine of trochoidal construction which is particularly advantageous for multi-disk piston constructions because it permits cam tracks which need not be subdivided with multi-piston disk arrangements.

Figure 2:
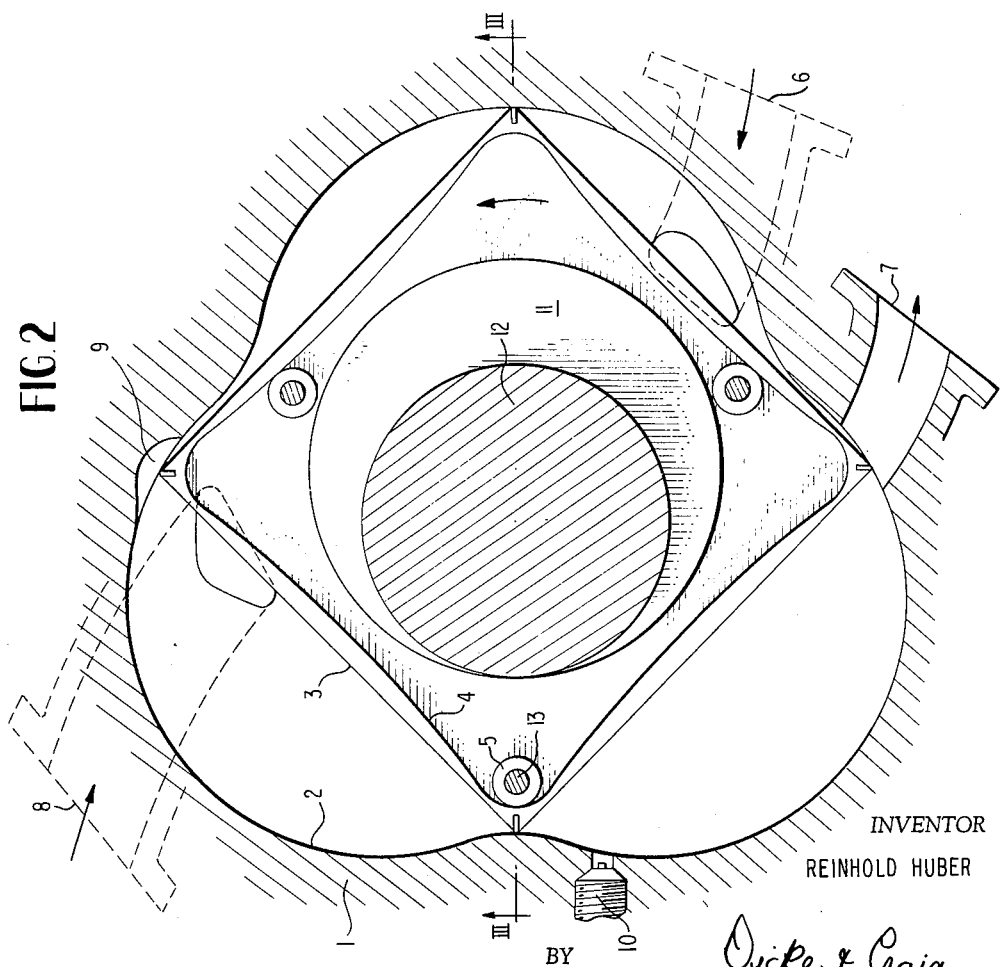

These and other objects, features and advantages of the present invention will become more obvious from the following description when taken in connection with the accompanying drawing which shows, in the several figures thereof, for purposes of illustration only, one embodiment in accordance with the present invention and wherein FIGURE 1 is the schematic cross sectional view illustrating the principle of the present invention, FIGURE 2 is a partial cross sectional view, similar to FIGURE 1, through a rotary piston internal combustion engine in accordance with the present invention, the cross section being taken at right angle to the shaft axis, and FIGURE 3 is a partial cross sectional view taken along the line III—III of FIGURE 2.

Referring now to the various figures of the drawing, in which like reference numerals are used to designate like parts, and more particularly to FIGURE 1, reference numeral 1 designates therein the housing of the internal combustion engine provided with walls constructed according to a three-arched epitrochoid. The piston 3 arranged within the space enclosed by the walls 2 is of quadrangular configuration as the internal envelope of the three-arched epitrochoid. The piston 3 is supported on the output shaft (not illustrated in FIGURE 1) with an eccentricity e and carries out a movement relative to the output shaft. This relative movement is achieved by the cam track 4 provided as internal contour which is arranged at the piston 3. The cam track 4 is constructed in cross section according to a four-arched hypotrochoid and the piston 3 is supported by means of this cam track 4 at the three guide rollers 5 supported in the side walls of the housing 1. The guide rollers 5 thereby represent the three corners of the internal envelope form associated with the hypotrochoidally-shaped cam track 4. As a result of the cooperation of the four-arched cam track 4 with the three guide rollers 5 there is achieved the rotary movement of the piston 3 relative to the output or drive shaft with ¾ of the angular velocity of the output or drive shaft as is necessary for practical operation of the internal combustion engine.

There is also achieved by a corresponding position and size of the cam track 4 in its relation to the piston 3 that the piston 3 together with the cam track 4 rigid therewith can be emplaced over or installed on the eccentric bearing of the drive shaft. This is of great importance with respect to a multi-piston arrangement because in that case the cam track need not be of divided construction, and may be secured at the piston already prior to installation or emplacement thereof on the bearing. For that purpose, the diameter of the eccentric bearing has to be somewhat smaller than the diameter of the internal circle for the cam track.

The rotary piston internal combustion engine illustrated in FIGURES 2 and 3 embodies the principle of the present invention illustrated in FIGURE 1 and comprises an engine housing 1, indicated only schematically, which is provided with peripheral surfaces 2 forming a three-lobed epitrochoid. The rotary piston 3 is provided with a cam track 4 of substantially hypotrochoidal shape and is rotatably supported about the eccentric 11 provided on the eccentric or output shaft 12. Reference numeral 6 indicates the inlet channel provided in the engine housing 1 while reference numeral 7 designates the outlet channel 7 also provided in the housing body. A further inlet channel 8 is provided within the housing 9. The internal peripheral surface 2 of the housing 1 is also provided with a small overflow channel 9. In case the engine operates as gasoline engine, a spark plug 10 is provided for igniting the combustion mixture. Of course, in the event the engine operates as self-igniting diesel engine, the spark plug 10 may be omitted. Additionally, a suitable injection nozzle may be provided in case the engine operates with fuel injection. The rotary piston internal combustion engine of FIGURES 2 and 3 is a six-stroke cycle and operates in the same manner as the engine illustrated in U.S. Patent 3,097,632 to Froede et al. The cam followers of guide rollers 5 are supported on bolts or pins 13 which are suitably secured in the side walls 14 (FIG. 3) of the housing of the internal combustion engine. Since the various parts and their arrangement and locations, with the exception of cam track 4 and the guide roller arrangement 5, 13 are known in the prior art, a detailed further description is dispensed with herein.

While I have shown and described one embodiment in accordance with the present invention, it is understood that this showing is only for purposes of illustration and that the present invention is not limited thereto since it is susceptible of many changes and modifications within the spirit and scope thereof. Consequently, I do not wish to be limited to the details shown and described herein, but intend to cover all such changes and modifications as are encompassed by the scope of the appended claims.

I claim:

1. A rotary piston internal combustion engine of trochoidal construction, comprising
    housing means forming a chamber provided with peripheral surface means and including sidewalls,
    a drive shaft journalled in said housing means and having eccentric means within said chamber,
    piston means rotatable about said eccentric means and operable to carry out rotary movements within said chamber and relative to said eccentric means to provide in effect variable volume working chambers,
    inlet and outlet means in said housing means in communication with said first mentioned chamber,
    and means in said engine for controlling the rotary movement of said piston means relative to said housing means including at least one trochoidally shaped cam track means rigid with said piston means and cam follower means provided at said housing means and cooperating with said cam track means for guiding said piston means relative to said housing means during the rotary movements of said piston means.

2. A rotary piston internal combustion engine according to claim 1 wherein said peripheral surface means is epitrochoidally shaped and said cam track means has a hypotrochoidal shape corresponding approximately to the inner envelope of the epitrochoid of said peripheral surface means.

3. A rotary piston internal combustion engine according to claim 1 wherein said peripheral surface means is hypotrochoidally shaped and said cam track means has an epitrochoidal shape corresponding approximately to the inner envelope of the hypotrochoid of said peripheral surface means.

4. A rotary piston engine according to claim 1 wherein said piston means is of hypotrochoidal shape and said peripheral surface means has a shape approximating the external envelope of said hypotrochoid.

5. A rotary piston engine according to claim 1 wherein said piston means is of epitrochoidal shape and said peripheral surface means has a shape approximating the external envelope of said epitrochoid.

6. A rotary piston internal combustion engine of trochoidal construction, comprising
    housing means forming a chamber provided with peripheral surface means and including sidewalls,
    a drive shaft journalled in said housing means and having eccentric means within said chamber,
    piston means rotatable about said eccentric means and operable to carry out rotary movements within said chamber and relative to said eccentric means to provide in effect variable volume working chambers,
    inlet and outlet means in said housing means in communication with said first mentioned chamber,
    and means in said engine for controlling the rotary movements of said piston means relative to said housing means including at least one epitrochoidally shaped cam track means rigid with said piston means and cam follower means provided at said housing means and cooperating with said cam track means for guiding said piston means relative to said housing means during the rotary movements of said piston means.

7. A rotary piston internal combustion engine of trochoidal construction, comprising
    housing means forming a chamber provided with peripheral surface means and including sidewalls,
    a drive shaft journalled in said housing means and having eccentric means within said chamber,
    piston means rotatable about said eccentric means and operable to carry out rotary movements within said chamber and relative to said eccentric means to provide in effect variable volume working chambers,
    inlet and outlet means in said housing means in communication with said first mentioned chamber,
    and means in said engine for controlling the rotary movements of said piston means relative to said housing means including at least one hypotrochoidally shaped cam track means rigid with said piston means and cam follower means provided at said housing means and cooperating with said cam track means for guiding said piston means relative to said housing means during the rotary movements of said piston means.

8. In a rotary-piston internal combustion engine having a housing defining a chamber provided with inlet and outlet means, an output shaft provided with an eccentric, and a rotary piston adapted to carry out rotary movements about said eccentric within the chamber of said housing, the improvement essentially consisting of means for controlling the rotary movements of said piston about said eccentric comprising cam means provided along one side of said piston, and cam engaging means provided at said housing in operative engagement with said cam means to thereby positively guide said piston in the rotary movements thereof with respect to said housing.

9. In a rotary piston internal combustion engine having a housing defining a chamber provided with inlet and outlet means, an output shaft provided with an eccentric, and a rotary piston carrying out rotary movements about said eccentric within the chamber of said housing, the improvement essentially consisting of means for guiding said piston in the rotary movements thereof about said eccentric comprising cam means arranged at the side of said piston, and cam engaging means at said housing in operative engagement with said cam means to thereby guide said piston in the rotary movements thereof with respect to said housing, said piston having one of the two shapes consisting of epitrochoidal and hypotrochoidal shape and said cam means having the other of said two shapes.

References Cited by the Examiner

UNITED STATES PATENTS

| | | | |
|---|---|---|---|
| 457,294 | 8/1891 | Tilden | 123—8 |
| 2,947,290 | 8/1960 | Froede | 123—8 |
| 2,988,065 | 6/1961 | Wankel et al. | 123—8 |
| 3,012,550 | 12/1961 | Paschke | 123—8 |

FOREIGN PATENTS 1,084,520    6/1960    Germany.

SAMUEL LEVINE, *Primary Examiner.*

RALPH H. BRAUNER, *Examiner.*

JOSEPH H. BRANSON, Jr., F. T. SADLER,
*Assistant Examiners.*